United States Patent [19]

Rion et al.

[11] Patent Number: 5,582,423
[45] Date of Patent: Dec. 10, 1996

[54] EXTRUDED MANIFOLD WITH PLASTIC HOUSING

[75] Inventors: Robert B. Rion, Livonia; Darin J. Turner, Warren, both of Mich.

[73] Assignee: AlliedSignal Inc., Morristown, N.J.

[21] Appl. No.: 494,829

[22] Filed: Jun. 26, 1995

[51] Int. Cl.⁶ .................................................. B60R 21/16
[52] U.S. Cl. ........................................ 280/728.2; 280/740
[58] Field of Search .................................. 280/728.2, 740

[56] References Cited

U.S. PATENT DOCUMENTS

| | | | |
|---|---|---|---|
| 5,284,358 | 2/1994 | Rhein | 280/728.2 |
| 5,407,223 | 4/1995 | Lauritzen et al. | 280/728.2 |
| 5,431,462 | 7/1995 | Webber et al. | 280/728.2 |

*Primary Examiner*—Kenneth R. Rice
*Attorney, Agent, or Firm*—Markell Seitzman

[57] ABSTRACT

An airbag module assembly includes an airbag, deployment housing, manifold, and inflator. The airbag has a plurality of apertures formed therethrough adjacent the airbag opening. The apertures of the airbag cooperate with tabs on the airbag deployment housing to secure the bag to the housing. The tabs of the airbag deployment housing snap into position between a pair of ears extending from the manifold. The ears are swaged and the manifold chamfered in order to hold the airbag deployment housing in position laterally along the manifold. Accordingly, for assembly, the airbag apertures are mated with the respective airbag deployment housing tabs, and the airbag deployment housing is snapped into position between the ears of the manifold. Alternatively, the ears are spaced sufficiently apart to allow the housing tabs to be placed therebetween, and the ears are then crimped, staked or swaged over the tabs.

19 Claims, 6 Drawing Sheets

5,582,423

EXTRUDED MANIFOLD WITH PLASTIC HOUSING

TECHNICAL FIELD

The present invention relates to a vehicle airbag assembly, and more particularly to an airbag module including a manifold and an airbag deployment housing.

BACKGROUND ART

Vehicle airbags have become very popular within the automotive industry, and have even become standard equipment in many vehicles. Airbag modules have been developed which are complete assemblies in that they contain an inflator, a container for the inflator, an airbag and a deployment housing attached to the container which houses the folded airbag. This module is typically attached to support structure beneath the instrument panel or steering wheel.

In present designs, airbag module assemblies come in a variety of configurations, and include a variety of components. However, known designs include a large number of parts and require substantial time and effort for assembly.

One such airbag module is disclosed in U.S. Pat. No. 5,263,739. The '739 patent provides a plastic housing in combination with an extruded inflator holding member. The inflator holding member includes slots for slidably receiving an airbag pack assembly. The airbag pack assembly includes an airbag, a U-shaped retainer, and an airbag deployment housing. For assembly, the airbag must first be inserted into the airbag deployment housing, and the hems of the airbag must be lined up with the slots formed at the bottom of the airbag deployment housing. The U-shaped retainer is then slid laterally into the hems of the airbag and into the slots of the airbag deployment housing to complete the bag pack assembly. Finally, the bag pack assembly is slid laterally into the grooves of the extruded inflator holding member and end plates are added in order to complete the assembly. The various steps of this process may be awkward and time consuming due to the number of components and the difficulty in mating the hem loops with the grooves in the airbag deployment housing, sliding the retainer into the airbag hem loops, and sliding the bag pack assembly into the grooves on the inflator holding member.

Another airbag module is shown in U.S. Pat. No. 5,332,356. Again, this design requires first inserting retainer rods into the airbag hems, and then sliding the airbag assembly laterally into slots formed in the manifold. Assembly also requires installation of bolts and end caps to hold the assembly together. Further, the manifold is a two-piece design, which adds assembly time.

Other complex airbag module assemblies, such as that disclosed in U.S. Pat. No. 5,407,227, include a large number of components and require lateral sliding of the airbag and deployment housing onto the manifold.

It is desirable to provide an airbag module of a simplified design with a one-piece manifold which does not require the airbag pack assembly to be slid laterally into a position of engagement with the manifold, thereby reducing assembly time.

DISCLOSURE OF THE INVENTION

The present invention solves the above referenced problems experienced in prior art assemblies by providing an airbag module assembly which includes a one-piece manifold and an airbag deployment housing which is pressed into engagement with the manifold without the need for bolts or lateral sliding of the bag pack assembly. The deployment housing is snapped, staked or crimped into engagement with the housing.

The present invention provides a vehicle airbag assembly, comprising a generally hollow manifold having at least one gas discharge opening formed therethrough and having a pair of ears extending therefrom. An airbag deployment housing includes a central aperture formed therethrough in fluid communication with the gas discharge opening. The airbag deployment housing further includes a plurality of tabs extending therefrom adjacent the central aperture for mating engagement with the ears. An airbag is provided with a first portion forming an airbag opening, and includes a plurality of apertures formed through the first portion adjacent the opening for respective engagement with the plurality of tabs to secure the airbag to the deployment housing. This arrangement facilitates respective engagement of the tabs within the plurality of apertures prior to connection of the chute with the ears.

The present invention further provides a vehicle airbag assembly, comprising an airbag having a first portion forming an airbag opening and having a plurality of apertures formed through the first portion adjacent the opening. A hollow airbag deployment housing is provided for housing the airbag. The airbag deployment housing has a plurality of tabs for respective cooperation with the apertures formed through the first portion of the airbag to secure the airbag to the deployment housing. A one-piece generally hollow manifold is provided, having at least one opening formed therethrough in fluid communication with the central aperture of the deployment housing. The manifold includes a pair of ears extending therefrom to facilitate mating cooperation with the plurality of tabs to secure the deployment housing and airbag to the manifold.

Accordingly, an object of the present invention is to provide an airbag module assembly which is simple in design and requires significantly reduced assembly time.

A further object of the present invention is to provide an airbag deployment housing which is snapped, staked, swaged or crimped onto the manifold, and does not require bolts or end caps for assembly.

Yet another object of the present invention is to provide an airbag module assembly which does not require longitudinal sliding of the bag pack assembly into slots on the manifold.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
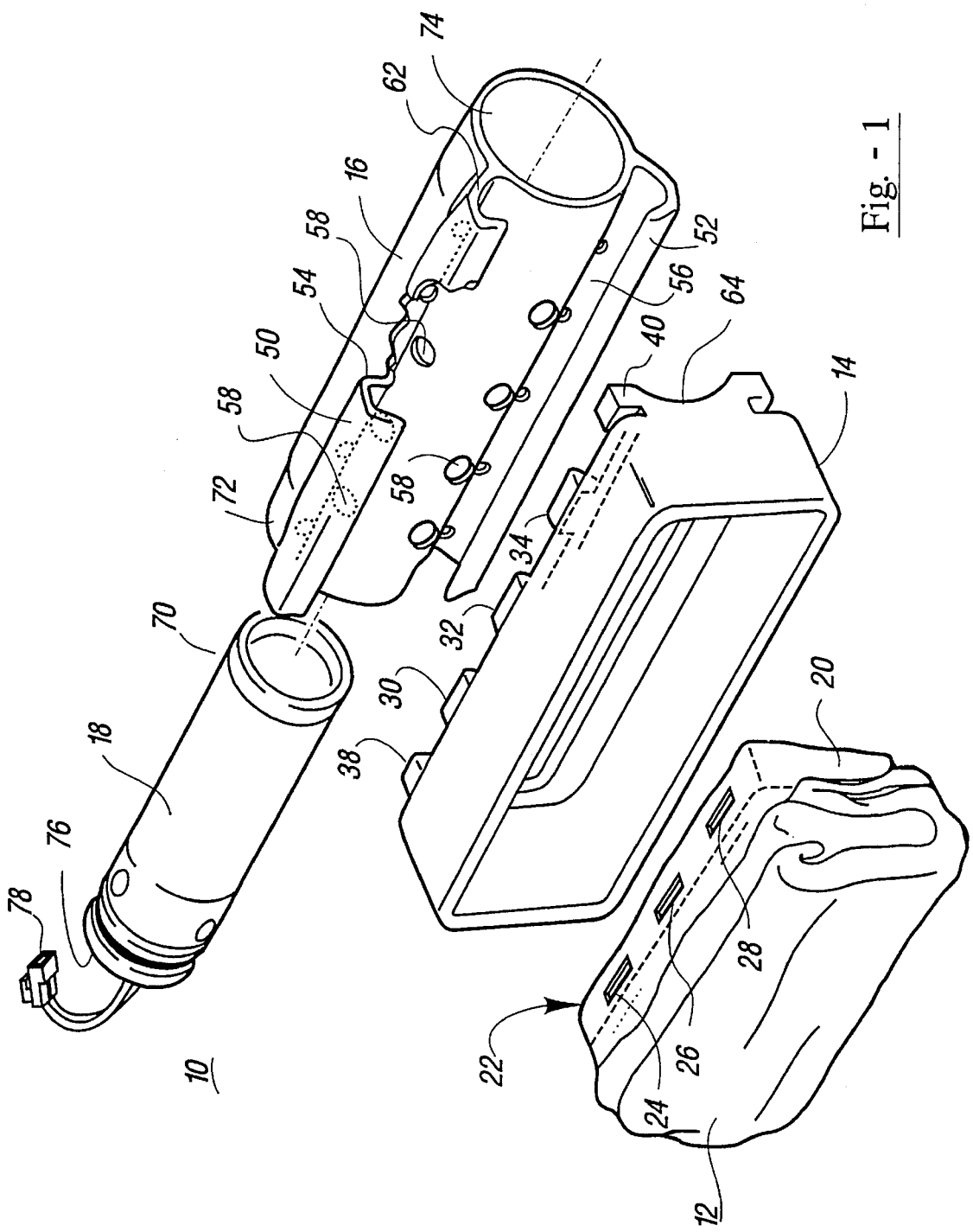
FIG. 1 shows a partially cutaway exploded perspective view of an airbag module assembly in accordance with the present invention.

FIG. 1 shows an airbag module assembly 10 in accordance with the present invention. The airbag module assembly 10 includes an airbag 12, a plastic airbag deployment housing 14, an aluminum manifold 16, and an inflator 18.

The airbag 12 includes a first portion 20 forming an airbag opening 22. The first portion includes apertures 24,26,28 formed therethrough adjacent the opening 22 for respective engagement with the tabs 30,32,34 extending from the airbag deployment housing 14. An opposing set of apertures (not visible) are formed through the first portion 20 opposite the apertures 24,26,28 on the other side of the opening 22.

The airbag deployment housing 14 includes a central aperture 36 formed therethrough. The tabs 30,32,34 extend from the airbag deployment housing 14 adjacent the central aperture 36. The airbag deployment housing 14 further includes end tabs 37,38,39,40 extending therefrom. The airbag deployment housing 14 also includes side walls 42,44,46,48 for housing the airbag 12, and for guiding deployment of the airbag 12, and further including an opposing second set of tabs (not visible in FIG. 1) across from the tabs 30,32,34.

For assembly, the airbag 12 is inserted through the deployment housing 14, and the two sets of apertures 24,26,28 of the airbag are mated with the two sets of tabs 30,32,34 to secure the airbag to the deployment housing. Thereafter the air bag is folded within the deployment housing 14. Depending upon the specific application here, a cover, having a frangible tear seam may be attached to the deployment housing 14. Typical of deployment housing covers the cover would also include hinge portions which permit parts of the cover on either side of the tear seam to pivot outwardly as the air bag is inflated.

The assembled airbag 12 and deployment housing 14 are moved radially to the manifold and positioned in cooperation with the ears 50,52 of the manifold 16. Each ear 50,52 forms a channel 54,56 for receiving the tabs 37,38,30,32, 34,39,40 of the airbag deployment housing 14. The tabs 37,38,30,32,34,39,40 are snapped into position between the resilient ears 50,52 in order to secure the airbag deployment housing 14 to the manifold 16. As the tabs are pressed between the ears 50,52, the ears flex outwardly to allow the tabs to pass between the ears. Once the tabs have cleared the ears, the ears resiliently snap into position to secure the tabs in the respective channel 54,56.

The manifold 16 includes a plurality of gas discharge openings 58, which are placed in fluid communication with the central aperture 36 of the deployment housing when the module is assembled. Finally, the inflator 18 is inserted into the manifold 16, and the manifold is crimped about the inflator providing a fluid seal therebetween, thus completing the assembly.

Figure 3:
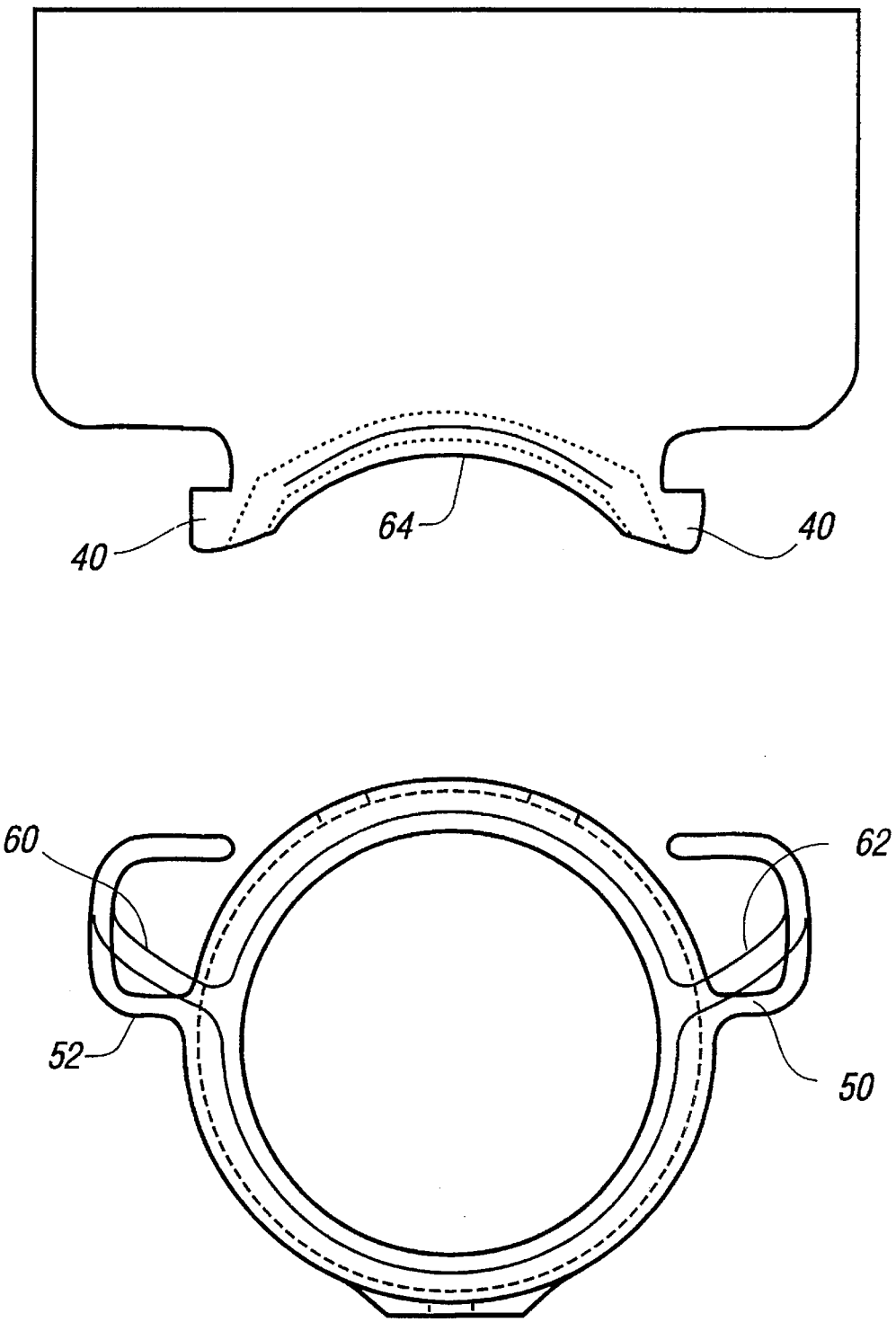
FIG. 3 shows an end view of a manifold and airbag deployment housing taken from FIG. 2.
Figure 4:
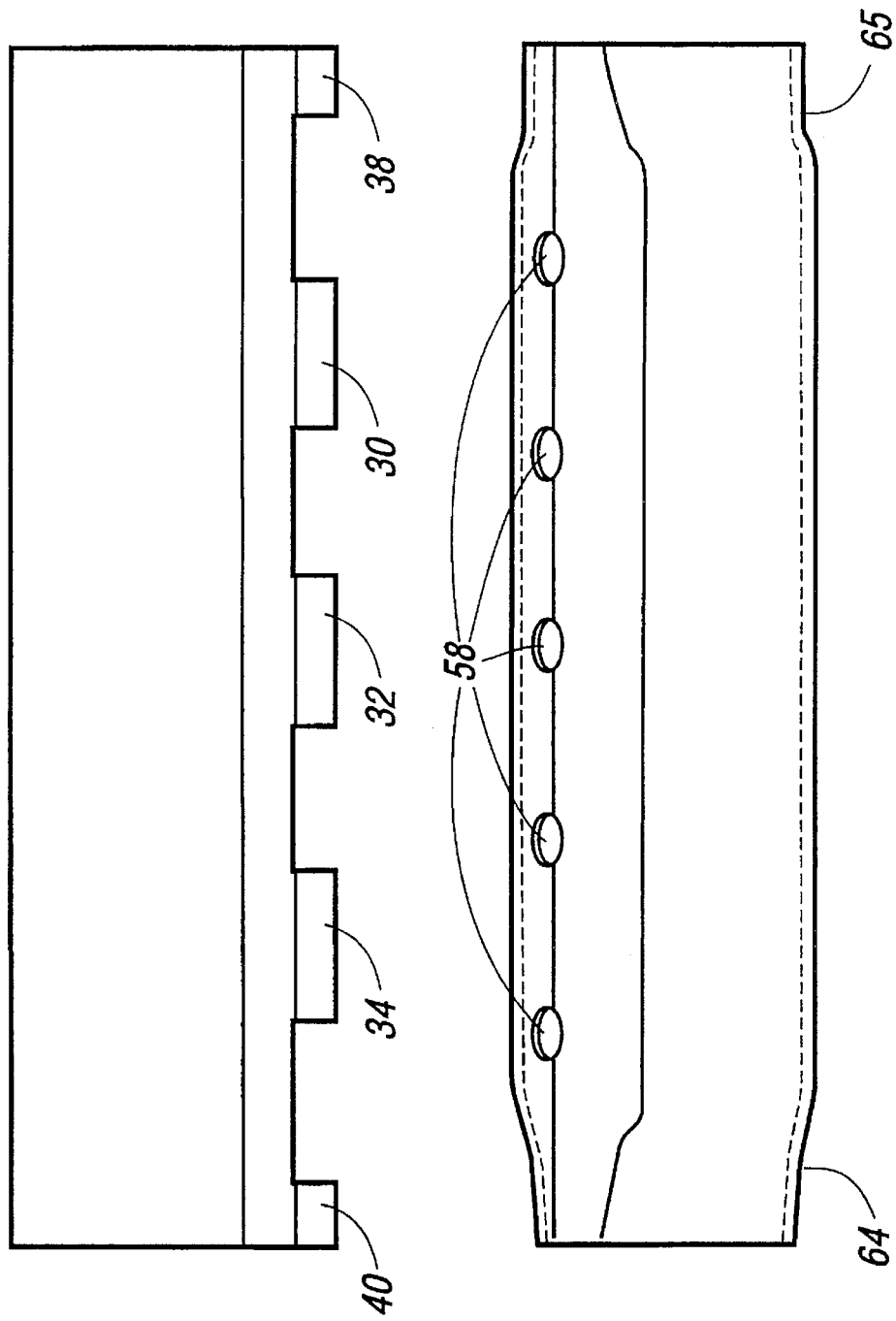
FIG. 4 shows a side view of a manifold and airbag deployment housing taken from FIG. 2.

As shown in FIG. 3, the ears 50,52 include swaged portions 60,62 at opposing ends of each ear in order to prevent longitudinal (axial) sliding movement of the airbag deployment housing 14 along the ears 50,52. The end tabs 38,40 are positioned to engage against the swaged portions 60,62 if the airbag deployment housing 14 moves longitudinally along the manifold 16.

Figure 2:
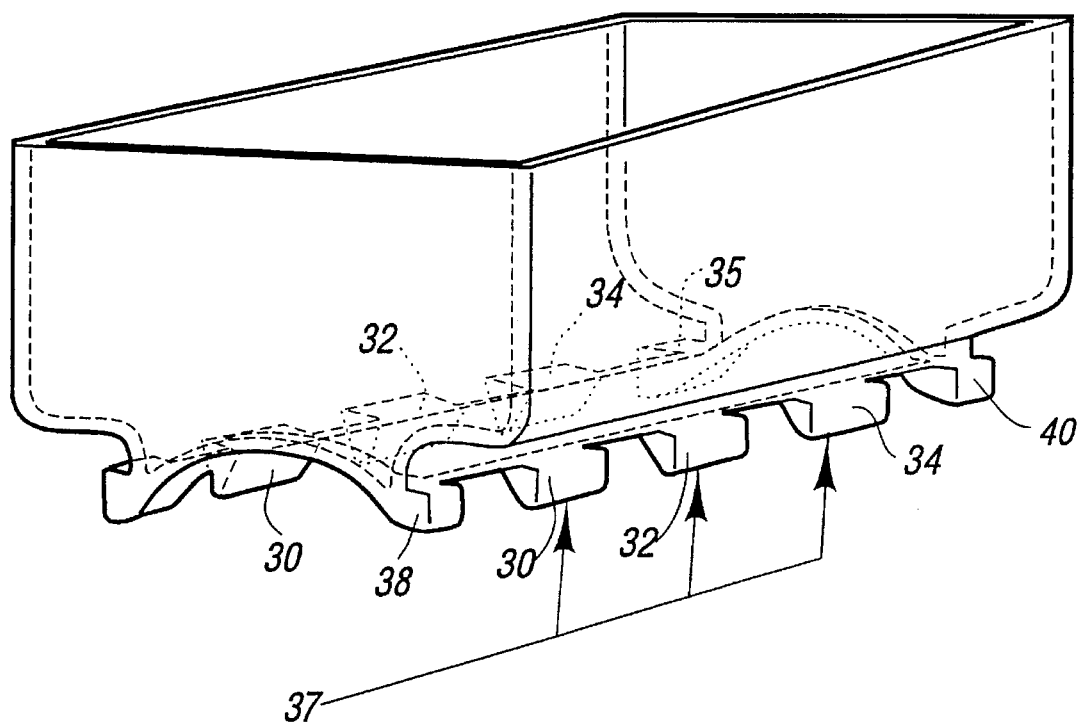
FIG. 2 shows an exploded perspective view of a manifold and airbag deployment housing in accordance with the present invention.
Figure 2:
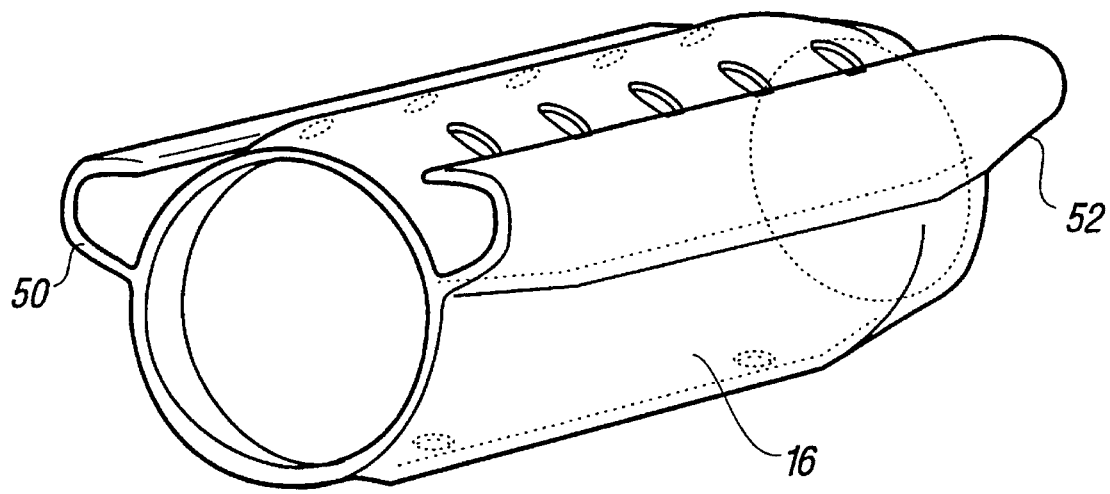
Figure 6:
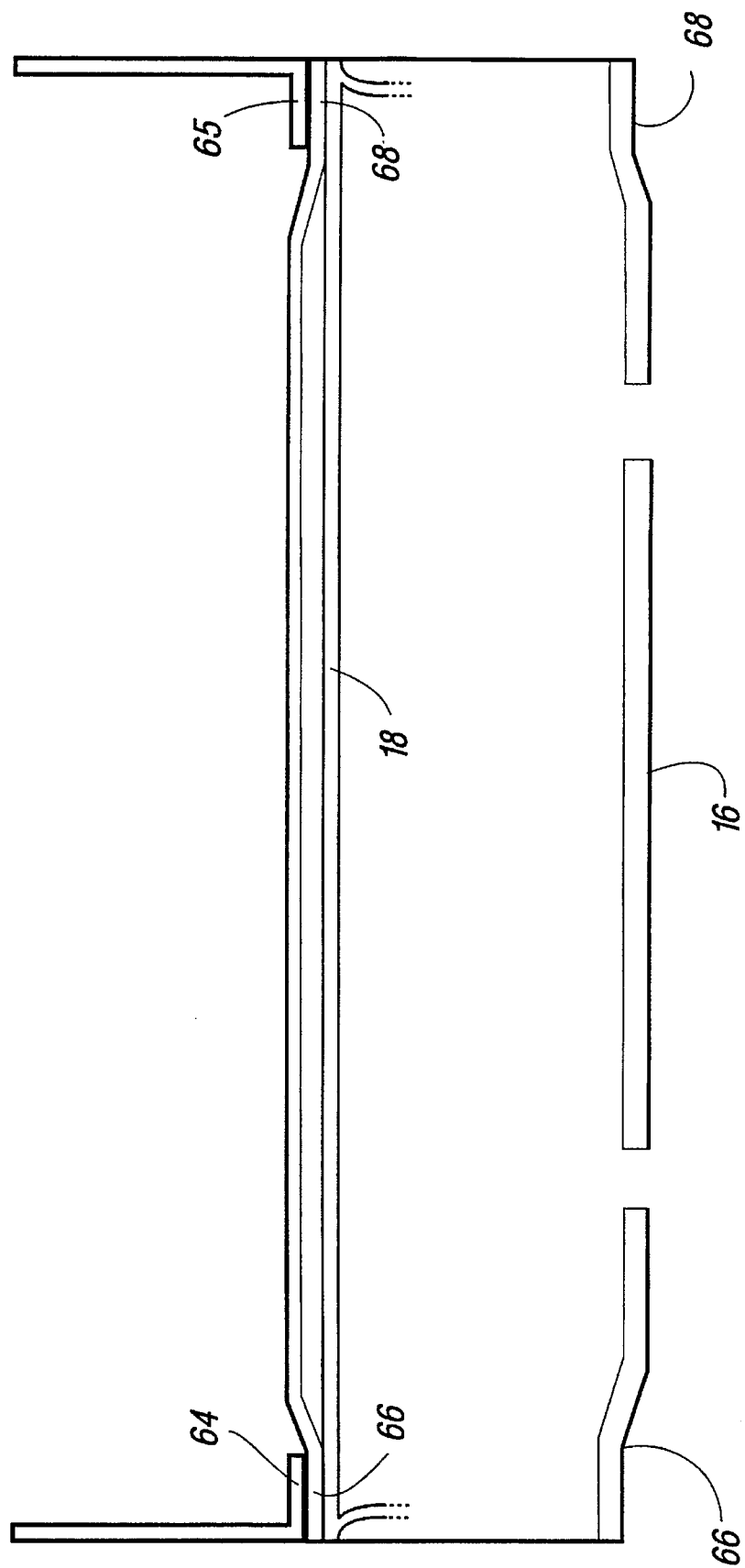
FIG. 6 shows a partial vertical cross-section of a manifold and airbag deployment housing in accordance with the present invention.

As shown in FIGS. 2, 3 and 6, the deployment housing 14 includes central curved portions 64,65 between the respective end tabs. The central curved portions 64,65 of the housing engage the first and second chamfered ends 66,68 of the manifold 16 in order to further prevent sliding lateral movement of the airbag deployment housing 14 with respect to the inflator 16. Accordingly, the end tabs 37,38,39,40 are pinched between the swaged portions 60,62 of the ears 50,52 and the chamfered ends 66,68 of the manifold in order to prevent sliding lateral movement of the airbag deployment housing 14 along the manifold 16.

Figure 5:
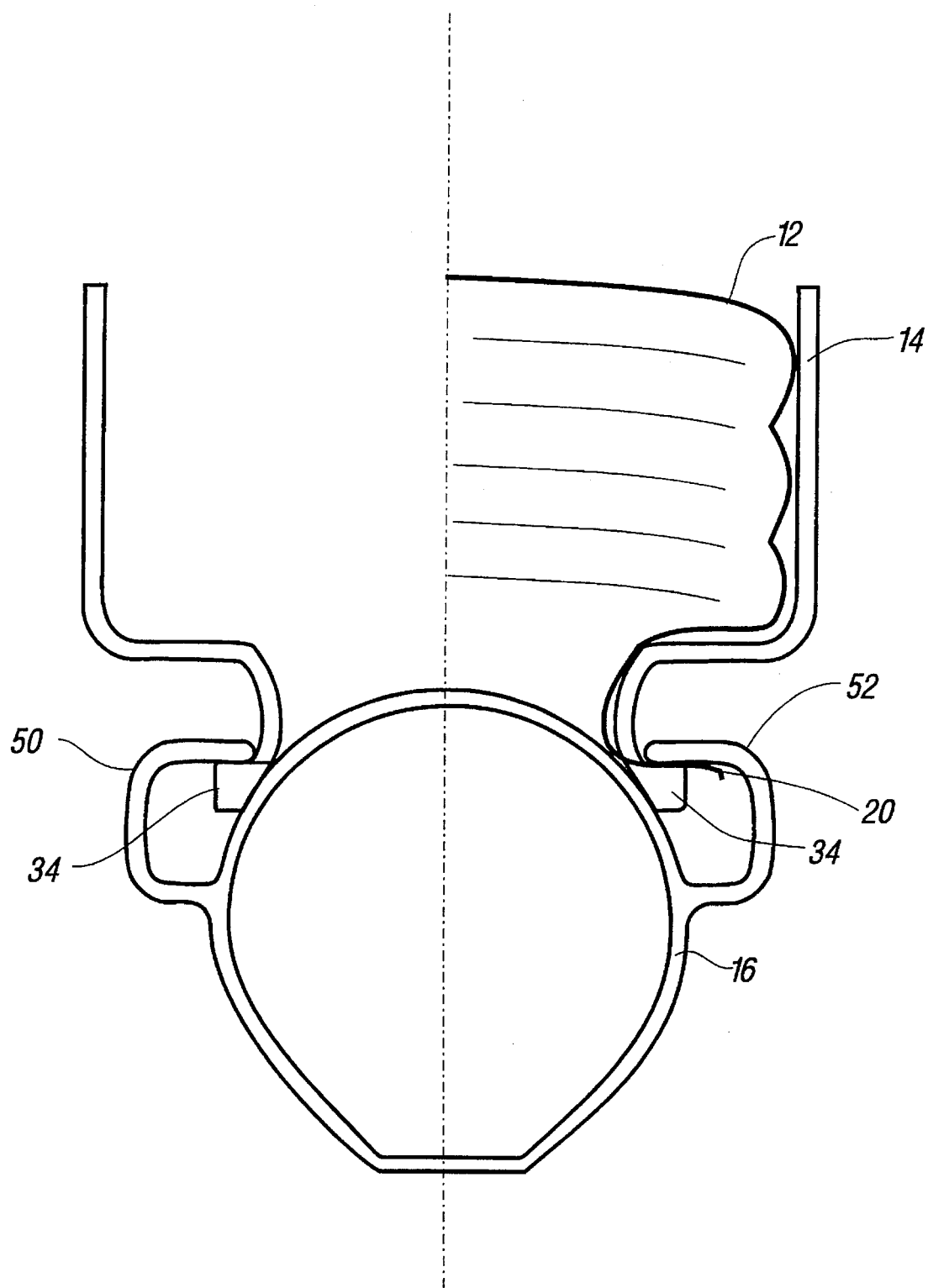
FIG. 5 shows a partially cutaway vertical cross-section through a partially assembled airbag module in accordance with the present invention.

FIG. 5 more clearly shows the final airbag module assembly in cross-section. The first portion 20 of the airbag 12 is pinched between the tab 34 and the ears 50,52, with each tab 30,32,34 extending through a corresponding aperture of the airbag. As shown, tab 34 extends through aperture 28. Ignition of the inflator 18 will send pressurized gas through the gas discharge openings 58, through the airbag deployment housing 14, and into the airbag to fill the airbag.

In this manner, the airbag apertures 24,26,28 are engaged with the tabs 30,32,34 to secure the airbag 12 to the airbag deployment housing 14, and the assembly is completed by merely engaging the airbag deployment housing 14 between the ears 50,52 of the manifold 16. This design substantially reduces assembly time in comparison to present airbag module assemblies.

The inflator 18 and manifold 16 have chamfered first and second longitudinal ends which cooperate to secure the inflator within the manifold while allowing insertion of the inflator into the manifold. The first end 70 of the inflator has a smaller diameter than the first end 72 of the manifold 16 in order to allow insertion of the inflator 18 into the manifold 16. The second end 74 of the manifold has a diameter sufficiently small to prevent the inflator 18 from exiting the manifold. Similarly, the second end 76 of the inflator comprises a diameter of sufficient width to allow insertion thereof through the first end 72 of the manifold and to prevent removal of the second end 76 of the inflator from the first end 72 of the manifold. Accordingly, the inflator 18 is nearly press fit within the manifold 16 by means of the smaller diameters of the first and second ends 72,74 of the manifold, which result from the chamfering 66,68 of the manifold 16. Therefore, no end plates are required. Alternatively, the manifold 16 may be crimped about the inflator 18 to provide a fluid seal.

The inflator 18 further includes an electrical attachment plug 78 for electrical communication with the inflator.

In alternative embodiments, the ears 50,52 of the manifold are spaced sufficiently apart to let the tabs of the housing be placed between the ears 50,52 without engaging the ears. The ears are then crimped together about the tabs, or staked, such as to permanently deform the ears inwardly, or swaged to secure the housing in position with respect to the manifold.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

What is claimed is:

1. A vehicle airbag assembly, comprising;

an airbag deployment housing having an aperture, and a plurality of extending tabs proximate said aperture;

an airbag having a first portion forming an airbag opening to receive inflation gas, and having a plurality of apertures formed through said first portion adjacent said opening, wherein each airbag tab aperture is looped about a corresponding housing tab; and a generally hollow manifold having at least one gas discharge opening, in fluid communication with said housing aperture, and clamp means for clamping upon the housing tabs to secure the manifold to the housing and for preventing each air bag tab aperture from dislodging from a corresponding housing tab.

2. The vehicle airbag assembly of claim 1, further comprising an inflator within the hollow of said manifold, said inflator having first and second ends.

3. A vehicle airbag assembly, comprising:

a generally hollow manifold having at least one gas discharge opening formed therethrough and having a pair of members extending therefrom;

an airbag deployment housing having a central aperture formed therethrough in fluid communication with said gas discharge opening, and further having a plurality of tabs extending therefrom adjacent said central aperture for mating engagement with said members; and an airbag having a first portion forming an airbag opening and having a plurality of apertures formed through said first portion adjacent said opening for respective engagement with said plurality of tabs to secure said airbag to said deployment housing;

wherein said manifold comprising chamfered first and second ends.

4. The vehicle airbag assembly of claim 3, further comprising an inflator within said manifold, the inflator having chamfered first and second ends and said first end of said inflator being narrower than said second end of said manifold to facilitate insertion of said inflator into said manifold.

5. The vehicle airbag assembly of claim 4, wherein said first and second chamfered ends of said manifold cooperate to secure said inflator therein.

6. The assembly as defined in claim 3 wherein said first end of said manifold having a narrower diameter than said second end of said manifold.

7. The vehicle airbag assembly of claim 1, wherein said airbag deployment housing further comprising end tabs on opposing ends of said housing, and each of said pair of ears including first and second swaged portions in cooperation with said end tabs to prevent said deployment housing from sliding laterally along said ears.

8. The vehicle airbag assembly of claim 1, wherein said airbag deployment housing comprises a plastic material and said manifold comprises aluminum.

9. The vehicle airbag assembly of claim 1, wherein said clamping means being resilient to facilitate snap-in engagement of the said plurality of tabs between said clamping means.

10. The vehicle airbag assembly of claim 1, wherein said manifold comprising one piece.

11. A vehicle airbag assembly, comprising:

a generally hollow one-piece manifold having at least one gas discharge opening formed therethrough, said manifold having first and second chamfered ends, and having a pair of ears extending from said manifold, each said ear having first and second swaged portions at opposing ends of the ears;

an airbag deployment housing having a central aperture formed therethrough in fluid communication with said gas discharge opening, said housing having a plurality of tabs extending from the housing adjacent said central aperture for snap-in cooperation with said ears, and further having end tabs on opposing ends of said housing in cooperation with said swaged portions to prevent said deployment housing from sliding laterally along said ears; and an airbag having a first portion forming an airbag opening and having a plurality of apertures formed through said first portion adjacent said opening for respective engagement with said plurality of tabs to secure said airbag to said deployment housing;

whereby to facilitate respective engagement of said tabs within said plurality of apertures prior to snap-in cooperation of said housing with said ears.

12. A vehicle airbag assembly, comprising:

an airbag having a first portion forming an airbag opening and having a plurality of apertures formed through said first portion adjacent said opening;

an airbag deployment housing for housing the airbag and having a central aperture formed therethrough, and further having a plurality of tabs extending from the deployment housing adjacent said central aperture for respective cooperation with said apertures formed through said first portion of said airbag to secure said airbag to said deployment housing;

a one-piece generally hollow manifold having at least one opening formed therethrough in fluid communication with said central aperture of said deployment housing, and including a pair of ears extending from the manifold to facilitate mating cooperation with said plurality of tabs to secure said deployment housing and airbag to said manifold;

wherein said manifold comprising chamfered first and second ends, said first end of said manifold having a narrower diameter than said second end of said manifold.

13. The vehicle airbag assembly of claim 12, wherein a first and a second end of an inflator is chamfered, the inflator fitted within the manifold, wherein said first end of said inflator is narrower than said second end of said manifold to facilitate insertion of said inflator into said manifold.

14. The vehicle airbag assembly of claim 13, wherein said first and second chamfered ends of said manifold cooperating to secure said inflator therein.

15. A vehicle airbag assembly, comprising:

an airbag having a first portion forming an airbag opening and having a plurality of apertures formed through said first portion adjacent said opening;

an airbag deployment housing for housing the airbag and having a central aperture formed therethrough, and further having a plurality of tabs extending from the deployment housing adjacent said central aperture for respective cooperation with said apertures formed through said first portion of said airbag to secure said airbag to said deployment housing;

a one-piece generally hollow manifold having at least one opening formed therethrough in fluid communication with said central aperture of said deployment housing, and including a pair of ears extending from the manifold to facilitate mating cooperation with said plurality of tabs to secure said deployment housing and airbag to said manifold;

wherein said airbag deployment housing further comprising a pair of end tabs on opposing ends of said housing, and each of said pair of ears including first and second swaged portions in cooperation with said end tabs to prevent said deployment housing from sliding laterally along said ears.

16. The vehicle airbag assembly of claim 15, wherein said airbag deployment housing comprises a plastic material and said manifold comprises aluminum.

17. A vehicle airbag assembly of claim 15, wherein said ears being resilient to facilitate snap-in engagement of said plurality of tabs between said ears.

18. A method of assembling an airbag assembly, the assembly comprising a hollow manifold having opposing ears forming respective channels, a hollow airbag deployment housing having a plurality of sets of tabs positioned to be engaged by a respective manifold ear, and an air bag having a plurality of apertures adapted to be received about a respective set of tabs, the method comprising:

a) placing the airbag apertures about the respective tabs, b) radially moving the airbag deployment housing against the manifold and c) causing the tabs to engage the ears.

19. The method as defined in claim 18 wherein the step of causing the tabs to engage the ears includes one of the steps of:

a) snapping the tabs in place within the ears, b) crimping the ears about the tabs and c) staking the ears inwardly into the tabs by permanently deforming the ears.

\* \* \* \* \*